US012113240B1

(12) United States Patent
Wucherer et al.

(10) Patent No.: US 12,113,240 B1
(45) Date of Patent: Oct. 8, 2024

(54) INSULATOR FOR BATTERY CELLS

(71) Applicant: Rivian IP Holdings, LLC, Irvine, CA (US)

(72) Inventors: Abigail Elizabeth Wucherer, Belmont, NC (US); Rajeev Dhiman, Pleasanton, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/487,972

(22) Filed: Oct. 16, 2023

(51) Int. Cl.
*H01M 50/463* (2021.01)
*H01M 50/103* (2021.01)
*H01M 50/403* (2021.01)

(52) U.S. Cl.
CPC ....... *H01M 50/463* (2021.01); *H01M 50/103* (2021.01); *H01M 50/403* (2021.01); *H01M 2220/20* (2013.01)

(58) Field of Classification Search
CPC ............. H01M 50/103; H01M 50/403; H01M 50/406; H01M 50/463; H01M 50/471; H01M 50/474; H01M 50/477; H01M 2220/20
See application file for complete search history.

(56) References Cited

U.S. PATENT DOCUMENTS

| 10,276,902 | B2 | 4/2019 | Park et al. | |
|---|---|---|---|---|
| 10,608,278 | B2 | 3/2020 | Liao et al. | |
| 2015/0207125 | A1* | 7/2015 | Kishimoto | H01M 50/538 429/129 |
| 2018/0261806 | A1* | 9/2018 | Kawate | H01M 50/474 |
| 2021/0036298 | A1* | 2/2021 | Kambayashi | H01M 10/0587 |
| 2023/0066385 | A1* | 3/2023 | Kwak | H01M 50/593 |
| 2024/0154251 | A1* | 5/2024 | Su | H01M 50/566 |

* cited by examiner

*Primary Examiner* — Christopher P Domone
(74) *Attorney, Agent, or Firm* — BAKERHOSTETLER

(57) ABSTRACT

Aspects of the disclosure relate to an insulator configured to attach to and extend along a length of a current collector of a battery cell. The insulator may include a body configured to prevent contact between the current collector and a housing of the battery cell. The insulator may include an attachment feature at a first end of the body. The attachment feature may be configured to attach the body to a first end of the current collector. The insulator may include a protrusion at a second end of the body. The protrusion may be configured to prevent rotation of the body with respect to the current collector.

19 Claims, 13 Drawing Sheets

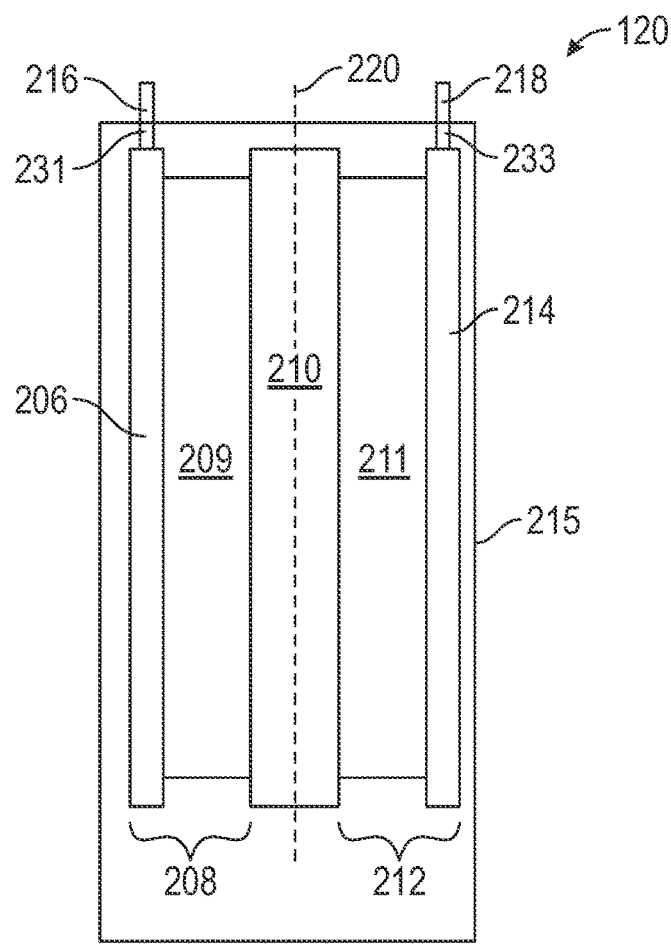
FIG. 2C
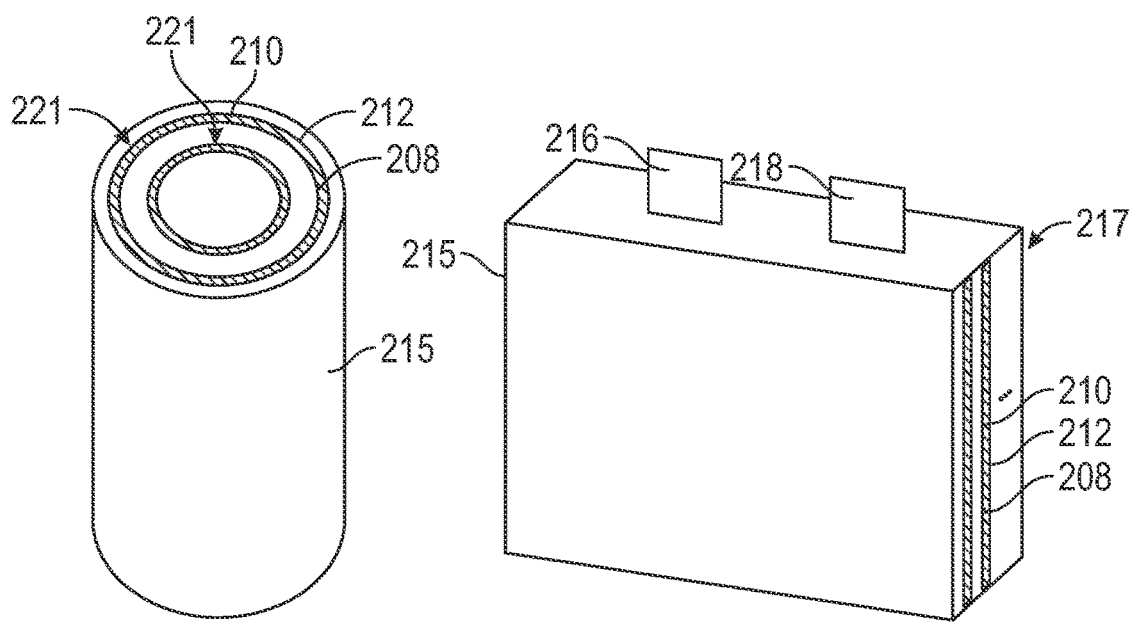
FIG. 2D
FIG. 2E

INSULATOR FOR BATTERY CELLS

INTRODUCTION

Batteries are often used as a source of power, including as a source of power for electric vehicles that include wheels that are driven by an electric motor that receives power from the battery.

Aspects of the subject technology can help to improve the reliability of battery cells, including battery cells for electric vehicles, which can help to mitigate climate change by reducing greenhouse gas emissions.

SUMMARY

Aspects of the subject technology relate to an insulator for a current collector for a prismatic battery cell. The insulator may be a snap-in insulator that helps prevent shorting of the current collector to a battery cell housing. The insulator may include features that prevent rotation of the insulator relative to the current collector, and features for accommodating foil tabs from an electrode stack of the battery cell. The insulator may also prevent scratching of the interior of the cell housing during insertion of the electrode stack into the cell housing.

In accordance with aspects of the subject technology, an apparatus is provided that includes an insulator configured to attach to and extend along a length of a current collector of a battery cell. The insulator includes: a body configured to prevent a contact between the current collector and a housing of the battery cell; at least one attachment feature at a first end of the body, the at least one attachment feature configured to attach the body to a first end of the current collector; and at least one protrusion at a second end of the body, the at least one protrusion configured to prevent rotation of the body with respect to the current collector.

The at least one protrusion may be configured to extend into an opening in the current collector. The at least one protrusion may include a first protrusion and a second protrusion, in which the first protrusion is configured to engage with a first inner surface of the opening in the current collector, and in which the second protrusion is configured to engage with an opposing second inner surface of the opening in the current collector.

The at least one attachment feature may include a pair of snap-in features configured to attach the body to the current collector using a snap fit. The body of the insulator may be formed from an insert molded insulating material. The body of the insulator may also include at least one flange configured to wrap around at least one corresponding edge of the current collector. The at least one flange may include a first flange along a first edge of the body and configured to wrap around a first corresponding edge of the current collector, and a second flange along an opposing second edge of the body and configured to wrap around a second corresponding edge of the current collector. A portion of the at least one flange is that is configured to wrap around the at least one corresponding edge of the current collector may be configured to be spaced apart from the current collector to form a gap between the current collector and the portion of the at least one flange for accommodating one or more tabs of an electrode stack of the battery cell. The body of the insulator may include a central opening that is configured to align with a central opening of the current collector.

In accordance with other aspects of the subject technology, a battery cell is provided that includes an insulator configured to attach to and extend along a length of a current collector of the battery cell. The insulator may include: a body configured to prevent a contact between the current collector and a housing of the battery cell; at least one attachment feature at a first end of the body, the at least one attachment feature configured to attach the body to a first end of the current collector; and at least one protrusion at a second end of the body, the at least one protrusion configured to prevent rotation of the body with respect to the current collector.

The battery cell may also include the current collector, and the battery cell may be a prismatic cell. The current collector may be disposed at a first end of the battery cell. The battery cell may also include an additional current collector at an opposing second end of the battery cell, and an additional insulator attached to the additional current collector.

The battery cell may also include an electrode stack; a lid; and an external contact forming a terminal on the lid. The current collector may connect the electrode stack to the terminal on the lid. The body of the insulator further may also include at least one flange configured to wrap around at least one corresponding edge of the current collector. The battery cell may also include a plurality of tabs extending from the electrode stack into a gap between the at least one flange and the current collector.

In accordance with other aspects of the subject technology, a method is provided that includes: welding a current collector of a battery cell to an electrode stack for the battery cell; attaching an insulator to the current collector, where the insulator includes at least one attachment feature at a first end and at least one protrusion at an opposing second, the at least one protrusion configured to prevent rotation of the insulator with respect to the current collector; and inserting, into a housing for the battery cell, the electrode stack with the current collector welded thereto and having the insulator attached to the current collector. The welding may include welding a plurality of foil tabs extending from the electrode stack to the current collector, and attaching the insulator to the current collector may include at least partially encompassing the plurality of foil tabs in a gap between the current collector and a flange of the insulator. During the inserting, the insulator may prevent contact between the current collector and the housing of the battery cell. The current collector may be disposed at a first end of the battery cell, and the method may also include, prior to the inserting, attaching an additional insulator to an additional current collector at an opposing second end of the battery cell.

BRIEF DESCRIPTION OF THE DRAWINGS

Certain features of the subject technology are set forth in the appended claims. However, for purpose of explanation, several embodiments of the subject technology are set forth in the following figures.

FIG. 2C illustrates a cross-sectional end view of a battery cell in accordance with one or more implementations.

FIG. 2D illustrates a cross-sectional perspective view of a cylindrical battery cell in accordance with one or more implementations.

FIG. 2E illustrates a cross-sectional perspective view of a prismatic battery cell in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Aspects of the subject technology described herein relate to an insulator for a current collector for a prismatic battery cell.

Figure 1A:
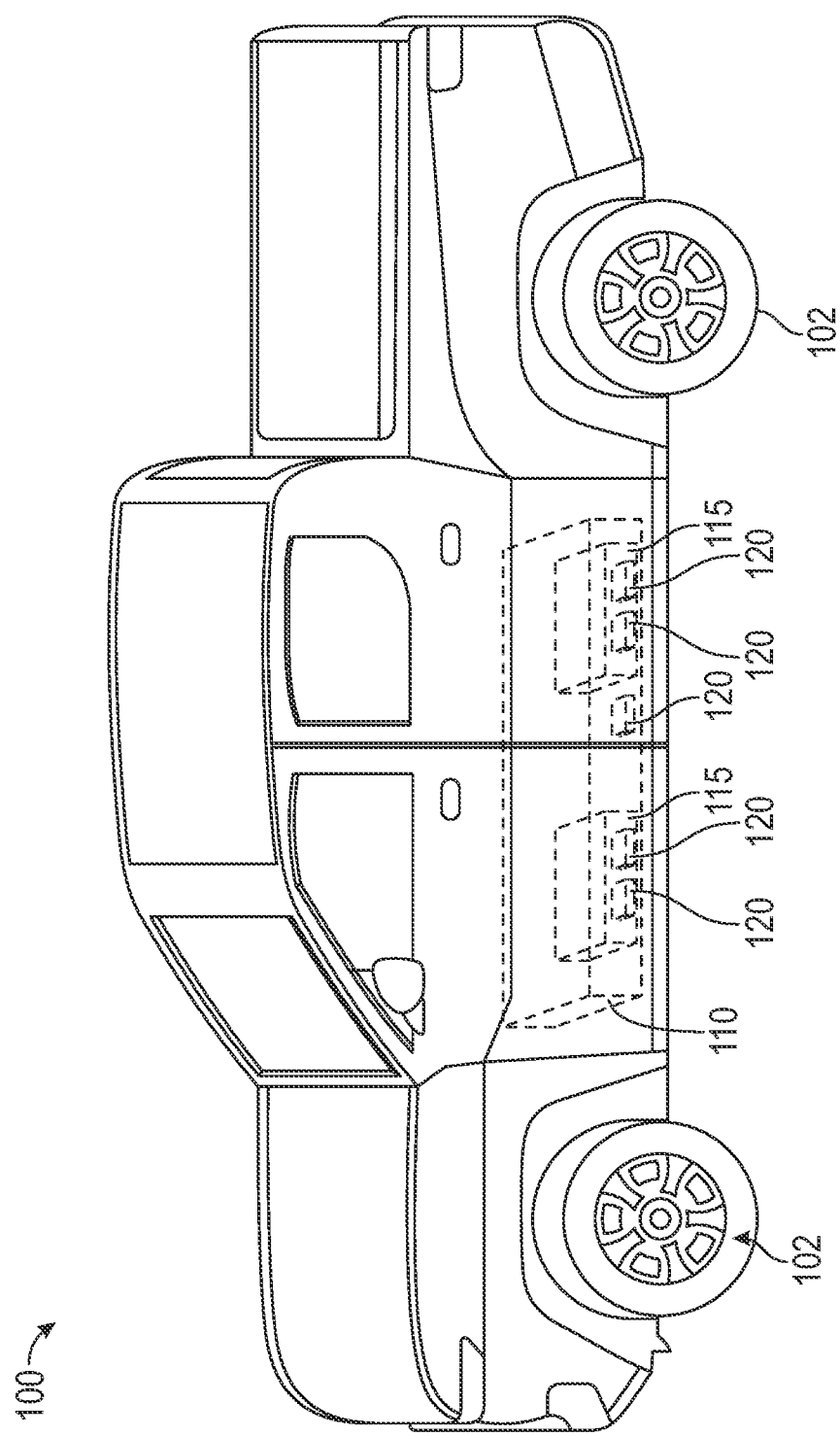
FIGS. 1A and 1B illustrate schematic perspective side views of example implementations of a vehicle having a battery pack in accordance with one or more implementations.

FIG. 1A is a diagram illustrating an example implementation of an apparatus, implemented as a moveable apparatus, as described herein. In the example of FIG. 1A, a moveable apparatus is implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle using electric power from the battery pack 110. In one or more implementations, the vehicle 100 may also, or alternatively, include one or more chemically powered engines, such as a gas-powered engine or a fuel cell powered motor. For example, electric vehicles can be fully electric or partially electric (e.g., hybrid or plug-in hybrid).

In the example of FIG. 1A, the vehicle 100 is implemented as a truck (e.g., a pickup truck) having a battery pack 110. As shown, the battery pack 110 may include one or more battery modules 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without any battery modules 115 and with the battery cells 120 mounted directly in the battery pack 110 (e.g., in a cell-to-pack configuration) and/or in other battery units that are installed in the battery pack 110. A vehicle battery pack can include multiple energy storage devices that can be arranged into such as battery modules or battery units. A battery unit or module can include an assembly of cells that can be combined with other elements (e.g., structural frame, thermal management devices) that can protect the assembly of cells from heat, shock and/or vibrations.

For example, the battery cell 120 can be included a battery, a battery unit, a battery module and/or a battery pack to power components of the vehicle 100. For example, a battery cell housing of the battery cell 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle and/or the motor(s) that drive the wheels 102 of the vehicle). The power stage circuit can be provided as part of the battery pack 110 or separately from the battery pack 110 within the vehicle 100.

Figure 1B:
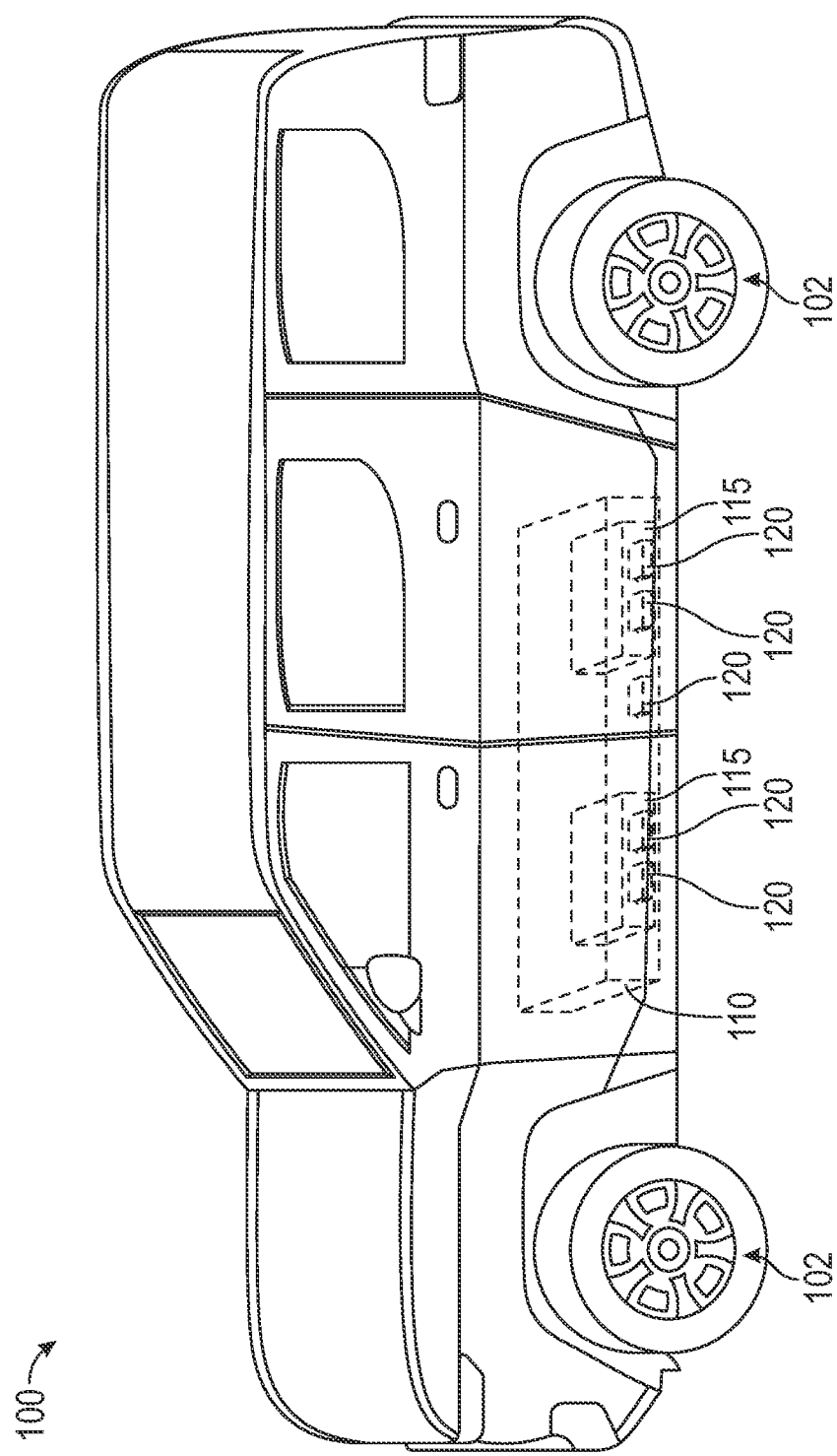

The example of FIG. 1A in which the vehicle 100 is implemented as a pickup truck having a truck bed at the rear portion thereof is merely illustrative. For example, FIG. 1B illustrates another implementation in which the vehicle 100 including the battery pack 110 is implemented as a sport utility vehicle (SUV), such as an electric sport utility vehicle. In the example of FIG. 1B, the vehicle 100 including the battery pack 110 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

Figure 1C:
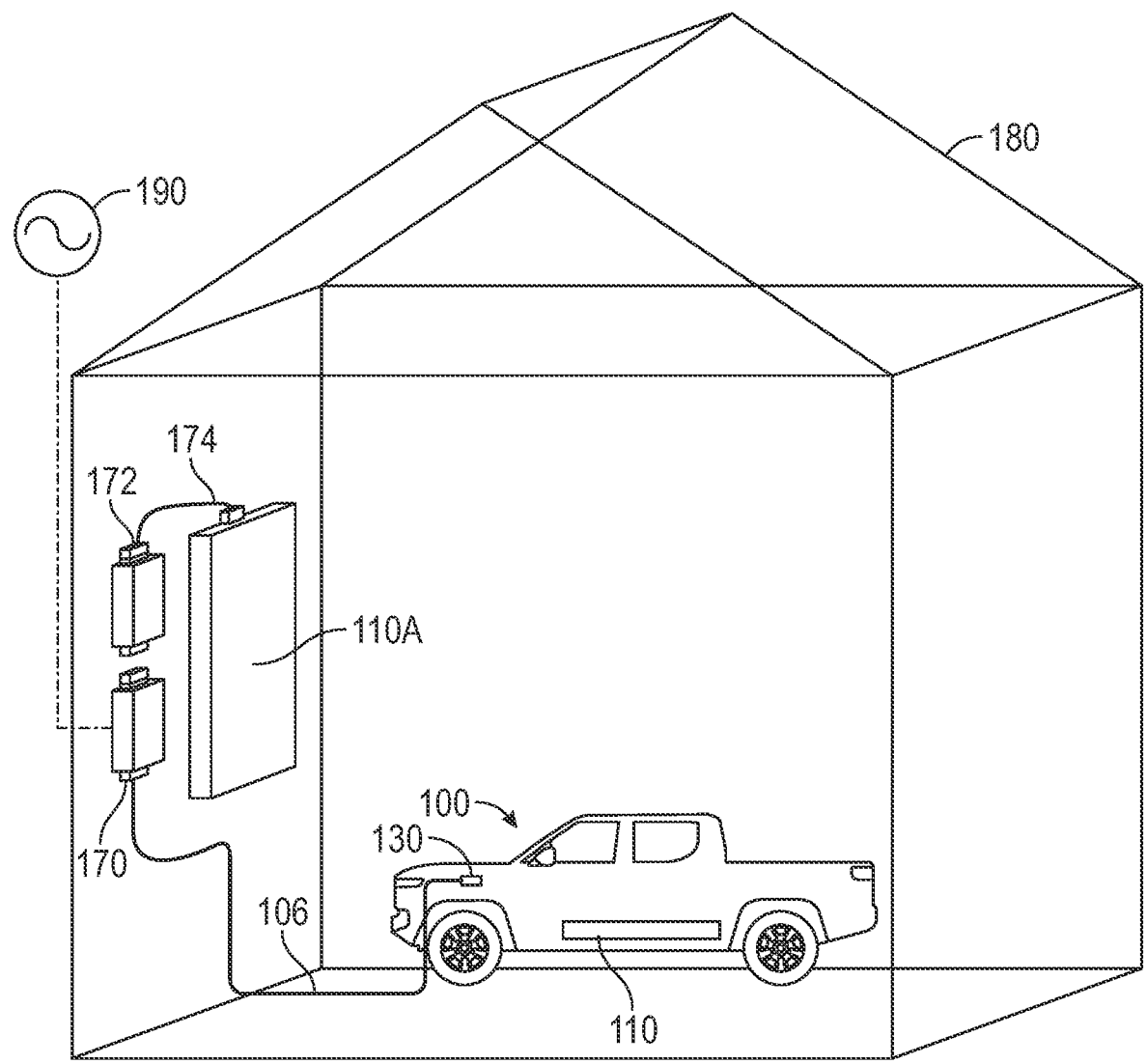
FIG. 1C illustrates a schematic perspective view of a building having a battery pack in accordance with one or more implementations.

In one or more implementations, a battery pack such as the battery pack 110, a battery module 115, a battery cell 120, and/or any other battery unit as described herein may also, or alternatively, be implemented as an electrical power supply and/or energy storage system in a building, such as a residential home or commercial building. For example, FIG. 1C illustrates an example in which a battery pack 110 is implemented in a building 180. For example, the building 180 may be a residential building, a commercial building, or any other building. As shown, in one or more implementations, a battery pack 110 may be mounted to a wall of the building 180.

As shown, the battery 110A that is installed in the building 180 may be couplable to the battery pack 110 in the vehicle 100, such as via: a cable/connector 106 that can be connected to the charging port 130 of the vehicle 100, electric vehicle supply equipment 170 (EVSE), a power stage circuit 172, and/or a cable/connector 174. For example, the cable/connector 106 may be coupled to the EVSE 170, which may be coupled to the battery 110A via the power stage circuit 172, and/or may be coupled to an external power source 190. In this way, either the external power source 190 or the battery 110A that is installed in the building 180 may be used as an external power source to charge the battery pack 110 in the vehicle 100 in some use cases. In some examples, the battery 110A that is installed in the building 180 may also, or alternatively, be coupled (e.g., via a cable/connector 174, the power stage circuit 172, and the EVSE 170) to the external power source 190. For example, the external power source 190 may be a solar power source, a wind power source, and/or an electrical grid of a city, town, or other geographic region (e.g., electrical grid that is powered by a remote power plant). During, for example, times when the battery pack 110 in the vehicle 100 is not coupled to the battery 110A that is installed in the building 180, the battery 110A that is installed in the building 180 can be coupled (e.g., using the power stage circuit 172 for the building 180) to the external power source 190 to charge up and store electrical energy. In some use cases, this stored electrical energy in the battery 110A that is installed in the building 180 can later be used to charge the battery pack 110 in the vehicle 100 (e.g., during times when solar power or wind power is not available, in the case of a regional or local power outage for the building 180, and/or during a period of high rates for access to the electrical grid).

In one or more implementations, the power stage circuit 172 may electrically couple the battery 110A that is installed in the building 180 to an electrical system of the building 180. For example, the power stage circuit 172 may convert DC power from the battery 110A into AC power for one or more loads in the building 180. For example, the battery 110A that is installed in the building 180 may be used to power one or more lights, lamps, appliances, fans, heaters, air conditioners, and/or any other electrical components or electrical loads in the building 180 (e.g., via one or more electrical outlets that are coupled to the battery 110A that is installed in the building 180). For example, the power stage circuit 172 may include control circuitry that is operable to switchably couple the battery 110A between the external power source 190 and one or more electrical outlets and/or other electrical loads in the electrical system of the building 180. In one or more implementations, the vehicle 100 may include a power stage circuit (not shown in FIG. 1C) that can be used to convert power received from the electric vehicle supply equipment 170 to DC power that is used to power/charge the battery pack 110 of the vehicle 100, and/or to convert DC power from the battery pack 110 into AC power for one or more electrical systems, components, and/or loads of the vehicle 100.

In one or more use cases, the battery 110A that is installed in the building 180 may be used as a source of electrical power for the building 180, such as during times when solar power or wind power is not available, in the case of a regional or local power outage for the building 180, and/or during a period of high rates for access to the electrical grid (as examples). In one or more other use cases, the battery pack 110 that is installed in the vehicle may be used to charge the battery 110A that is installed in the building 180 and/or to power the electrical system of the building 180 (e.g., in a use case in which the battery 110A that is installed in the building 180 is low on or out of stored energy and in which solar power or wind power is not available, a regional or local power outage occurs for the building 180, and/or a period of high rates for access to the electrical grid occurs (as examples)).

Figure 2A:
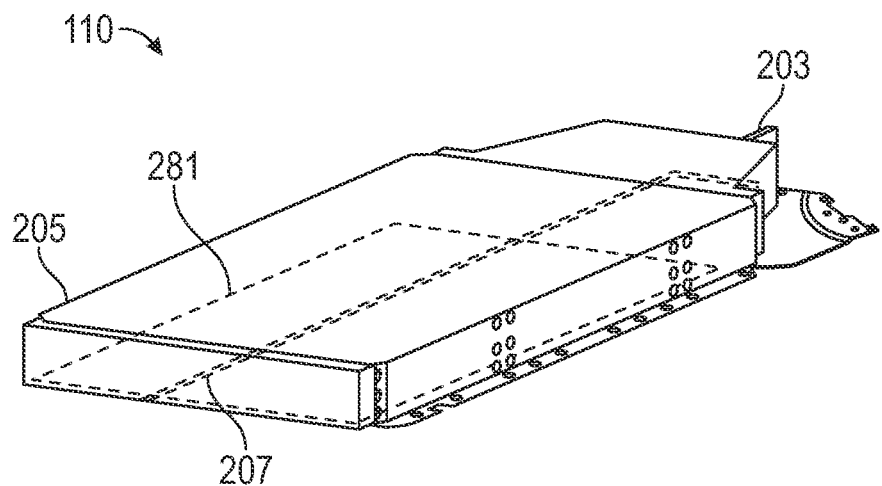
FIG. 2A illustrates a schematic perspective view of a battery pack in accordance with one or more implementations.

FIG. 2A depicts an example battery pack 110. Battery pack 110 may include multiple battery cells 120 (e.g., directly installed within the battery pack 110, or within batteries, battery units, and/or battery modules 115 as described herein) and/or battery modules 115, and one or more conductive coupling elements for coupling a voltage generated by the battery cells 120 to a power-consuming component, such as the vehicle 100 and/or an electrical system of a building 180. For example, the conductive coupling elements may include internal connectors and/or contactors that couple together multiple battery cells 120, battery units, batteries, and/or multiple battery modules 115 within the battery pack frame 205 to generate a desired output voltage for the battery pack 110. The battery pack 110 may also include one or more external connection ports, such as an electrical contact 203 (e.g., a high voltage terminal). For example, an electrical cable (e.g., cable/connector 106) may be connected between the electrical contact 203 and an electrical system of the vehicle 100 or the building 180, to provide electrical power to the vehicle 100 or the building 180.

As shown, the battery pack 110 may include a battery pack frame 205 (e.g., a battery pack housing or pack frame). For example, the battery pack frame 205 may house or enclose one or more battery modules 115 and/or one or more battery cells 120, and/or other battery pack components. In one or more implementations, the battery pack frame 205 may include or form a shielding structure on an outer surface thereof (e.g., a bottom thereof and/or underneath one or more battery module 115, battery units, batteries, and/or battery cells 120) to protect the battery module 115, battery units, batteries, and/or battery cells 120 from external conditions (e.g., if the battery pack 110 is installed in a vehicle 100 and the vehicle 100 is driven over rough terrain, such as off-road terrain, trenches, rocks, rivers, streams, etc.).

In one or more implementations, the battery pack 110 may include one or more thermal control structures 207 (e.g., cooling lines and/or plates and/or heating lines and/or plates). For example, thermal control structures 207 may couple thermal control structures and/or fluids to the battery modules 115, battery units, batteries, and/or battery cells 120 within the battery pack frame 205, such as by distributing fluid through the battery pack 110.

For example, the thermal control structures 207 may form a part of a thermal/temperature control or heat exchange system that includes one or more thermal components 281 such as plates or bladders that are disposed in thermal contact with one or more battery modules 115 and/or battery cells 120 disposed within the battery pack frame 205. For example, a thermal component 281 may be positioned in contact with one or more battery modules 115, battery units, batteries, and/or battery cells 120 within the battery pack frame 205. In one or more implementations, the battery pack 110 may include one or multiple thermal control structures 207 and/or other thermal components for each of several top and bottom battery module pairs. As shown, the battery pack 110 may include an electrical contact 203 (e.g., a high voltage connector) by which an external load (e.g., the vehicle 100 or an electrical system of the building 180) may be electrically coupled to the battery modules and/or battery cells in the battery pack 110.

Figure 2B:
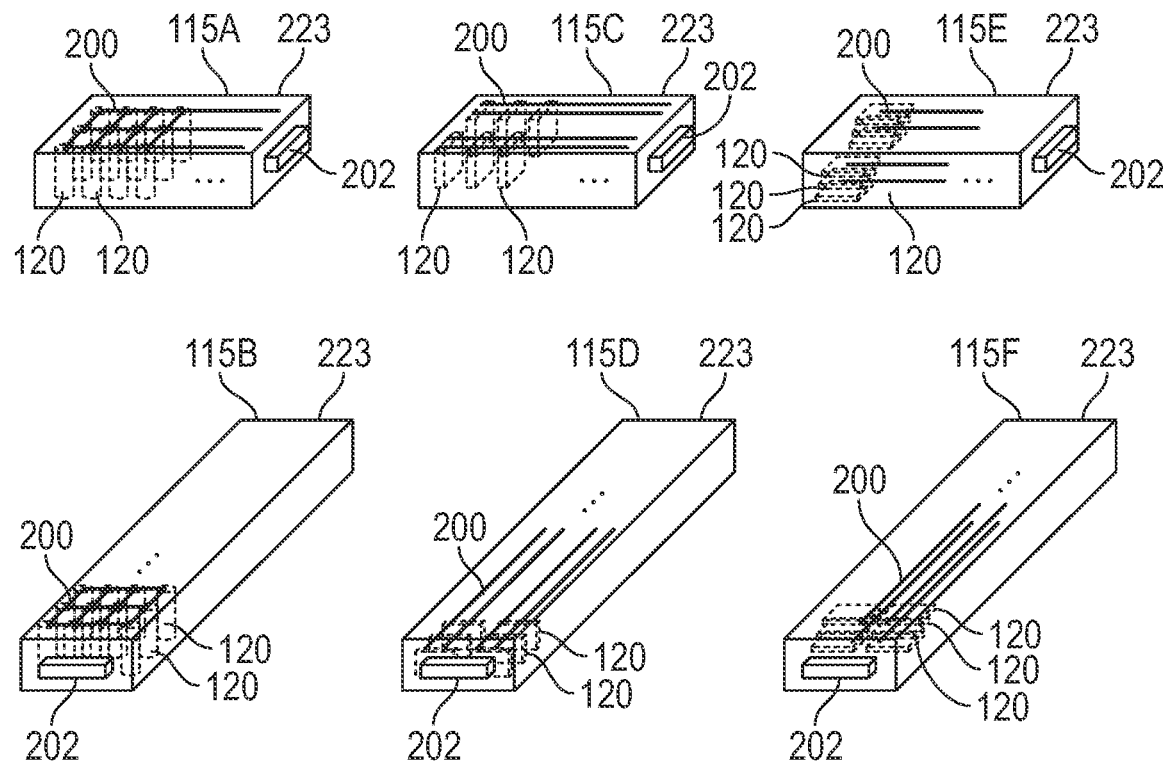
FIG. 2B illustrates schematic perspective views of various battery modules that may be included in a battery pack in accordance with one or more implementations.

FIG. 2B depicts various examples of battery modules 115 that may be disposed in the battery pack 110 (e.g., within the battery pack frame 205 of FIG. 2A). In the example of FIG. 2B, a battery module 115A is shown that includes a battery module housing 223 having a rectangular cuboid shape with a length that is substantially similar to its width. In this example, the battery module 115A includes multiple battery cells 120 implemented as cylindrical battery cells. In this example, the battery module 115A includes rows and columns of cylindrical battery cells that are coupled together by an interconnect structure 200 (e.g., a current connector assembly or CCA). For example, the interconnect structure 200 may couple together the positive terminals of the battery cells 120, and/or couple together the negative battery terminals of the battery cells 120. As shown, the battery module 115A may include a charge collector or bus bar 202. For example, the bus bar 202 may be electrically coupled to the interconnect structure 200 to collect the charge generated by the battery cells 120 to provide a high voltage output from the battery module 115A.

FIG. 2B also shows a battery module 115B having an elongate shape, in which the length of the battery module housing 223 (e.g., extending along a direction from a front end of the battery pack 110 to a rear end of the battery pack 110 when the battery module 115B is installed in the battery pack 110) is substantially greater than a width (e.g., in a transverse direction to the direction from the front end of the battery pack 110 to the rear end of the battery pack 110 when the battery module 115B is installed in the battery pack 110) of the battery module housing 223. For example, one or more battery modules 115B may span the entire front-to-back length of a battery pack within the battery pack frame 205. As shown, the battery module 115B may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115B.

In the implementations of battery module 115A and battery module 115B, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115C having a battery module housing 223 having a rectangular cuboid shape with a length that is substantially similar to its width and including multiple battery cells 120 implemented as prismatic battery cells. In this example, the battery module 115C includes rows and columns of prismatic battery cells that are coupled together by an interconnect structure 200 (e.g., a current collector assembly or CCA). For example, the interconnect structure 200 may couple together the positive terminals of the battery cells 120 and/or couple together the negative battery terminals of the battery cells 120. As shown, the battery module 115C may include a charge collector or bus bar 202. For example, the bus bar 202 may be electrically coupled to the interconnect structure 200 to collect the charge generated by the battery cells 120 to provide a high voltage output from the battery module 115C.

FIG. 2B also shows a battery module 115D including prismatic battery cells and having an elongate shape, in which the length of the battery module housing 223 (e.g., extending along a direction from a front end of the battery pack 110 to a rear end of the battery pack 110 when the battery module 115D is installed in the battery pack 110) is substantially greater than a width (e.g., in a transverse direction to the direction from the front end of the battery pack 110 to the rear end of the battery pack 110 when the battery module 115D is installed in the battery pack 110) of the battery module housing 223. For example, one or more battery modules 115D having prismatic battery cells may span the entire front-to-back length of a battery pack within the battery pack frame 205. As shown, the battery module 115D may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115D.

As another example, FIG. 2B also shows a battery module 115E having a battery module housing 223 having a rectangular cuboid shape with a length that is substantially similar to its width and including multiple battery cells 120 implemented as pouch battery cells. In this example, the battery module 115C includes rows and columns of pouch battery cells that are coupled together by an interconnect structure 200 (e.g., a current collector assembly or CCA). For example, the interconnect structure 200 may couple together the positive terminals of the battery cells 120 and couple together the negative battery terminals of the battery cells 120. As shown, the battery module 115E may include a charge collector or bus bar 202. For example, the bus bar 202 may be electrically coupled to the interconnect structure 200 to collect the charge generated by the battery cells 120 to provide a high voltage output from the battery module 115E.

FIG. 2B also shows a battery module 115F including pouch battery cells and having an elongate shape in which the length of the battery module housing 223 (e.g., extending along a direction from a front end of the battery pack 110 to a rear end of the battery pack 110 when the battery module 115E is installed in the battery pack 110) is substantially greater than a width (e.g., in a transverse direction to the direction from the front end of the battery pack 110 to the rear end of the battery pack 110 when the battery module 115E is installed in the battery pack 110) of the battery module housing 223. For example, one or more battery modules 115E having pouch battery cells may span the entire front-to-back length of a battery pack within the battery pack frame 205. As shown, the battery module 115E may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115E.

In various implementations, a battery pack 110 may be provided with one or more of any of the battery modules 115A, 115B, 115C, 115D, 115E, and 115F. In one or more other implementations, a battery pack 110 may be provided without battery modules 115 (e.g., in a cell-to-pack implementation).

In one or more implementations, multiple battery modules 115 in any of the implementations of FIG. 2B may be coupled (e.g., in series) to a current collector of the battery pack 110. In one or more implementations, the current collector may be coupled, via a high voltage harness, to one or more external connectors (e.g., electrical contact 203) on the battery pack 110. In one or more implementations, the battery pack 110 may be provided without any battery modules 115. For example, the battery pack 110 may have a cell-to-pack configuration in which battery cells 120 are arranged directly into the battery pack 110 without assembly into a battery module 115 (e.g., without including a separate battery module housing 223). For example, the battery pack 110 (e.g., the battery pack frame 205) may include or define a plurality of structures for positioning of the battery cells 120 directly within the battery pack frame 205.

FIG. 2C illustrates a cross-sectional end view of a portion of a battery cell 120. As shown in FIG. 2C, a battery cell 120 may include an anode 208, an electrolyte 210, and a cathode 212. As shown, the anode 208 may include or be electrically coupled to a first current collector 206 (e.g., a metal layer such as a layer of copper foil or other metal foil). For example, an anode material 209 may be coated on a region of a surface of the first current collector 206 to form the anode 208. As shown, the cathode 212 may include or be electrically coupled to a second current collector 214 (e.g., a metal layer such as a layer of aluminum foil or other metal foil). For example, a cathode material 211 may be coated on a region of a surface of the second current collector 214 to form the cathode 212.

As shown, the battery cell 120 may include a first terminal 216 (e.g., a negative terminal) coupled to the anode 208 (e.g., coupled to the anode 208 via one or more interconnect structures 231, such as a first tab and a first separate current collector for the battery cell, the first tab having a first end welded to the first current collector 206 of the anode 208 and having a second end welded to the first separate current collector for the battery cell) and a second terminal 218 (e.g., a positive terminal) coupled to the cathode 212 (e.g., coupled to the cathode 212 via one or more interconnect structures 233, such as a second tab and a second separate current collector for the battery cell, the second tab having a first end welded to the second current collector 214 of the cathode 212 and having a second end welded to a second separate current collector for the battery cell). In various implementations, the electrolyte 210 may be a liquid electrolyte layer or a solid electrolyte layer. In one or more implementations (e.g., implementations in which the electrolyte 210 is a liquid electrolyte layer), the battery cell 120 may include a separator layer 220 that separates the anode 208 from the cathode 212. In one or more implementations in which the electrolyte 210 is a solid electrolyte layer, the solid electrolyte layer may act as both separator layer and an electrolyte layer.

In one or more implementations, the battery cell 120 may be implemented as a lithium ion battery cell in which the anode 208 is formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode 208 may be formed from a graphite material that is coated on a copper foil corresponding to the first current collector 206. In these lithium ion implementations, the cathode 212 may be formed from one or more metal oxides (e.g., a lithium cobalt oxide, a lithium manganese oxide, a lithium nickel manganese cobalt oxide (NMC), or the like) and/or a lithium iron phosphate. As shown, the battery cell 120 may include a separator layer 220 that separates the anode 208 from the cathode 212. In an implementation in which the battery cell 120 is implemented as a lithium-ion battery cell, the electrolyte 210 may include a lithium salt in an organic solvent. The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Although some examples are described herein in which the battery cells 120 are implemented as lithium-ion battery cells, some or all of the battery cells 120 in a battery module 115, battery pack 110, or other battery or battery unit may be implemented using other battery cell technologies, such as nickel-metal hydride battery cells, lead-acid battery cells, and/or ultracapacitor cells. For example, in a nickel-metal hydride battery cell, the anode 208 may be formed from a hydrogen-absorbing alloy and the cathode 212 may be formed from a nickel oxide-hydroxide. In the example of a nickel-metal hydride battery cell, the electrolyte 210 may be formed from an aqueous potassium hydroxide in one or more examples.

The battery cell 120 may be implemented as a lithium sulfur battery cell in one or more other implementations. For example, in a lithium sulfur battery cell, the anode 208 may be formed at least in part from lithium, the cathode 212 may be formed from at least in part form sulfur, and the electrolyte 210 may be formed from a cyclic ether, a short-chain ether, a glycol ether, an ionic liquid, a super-saturated salt-solvent mixture, a polymer-gelled organic media, a solid polymer, a solid inorganic glass, and/or other suitable electrolyte materials.

In various implementations, the anode 208, the electrolyte 210, and the cathode 212 of FIG. 2C can be packaged into a battery cell housing having any of various shapes, and/or sizes, and/or formed from any of various suitable materials. For example, battery cells 120 can have a cylindrical, rectangular, square, cubic, flat, pouch, elongated, or prismatic outer shape. As depicted in FIG. 2D, for example, a battery cell such as the battery cell 120 may be implemented as a cylindrical cell. In the example of FIG. 2D, the battery cell 120 includes a cell housing 215 having a cylindrical outer shape. For example, the anode 208, the electrolyte 210, and the cathode 212 may be rolled into one or more substantially cylindrical windings 221. As shown, one or more windings 221 of the anode 208, the electrolyte 210, and the cathode 212 (e.g., and/or one or more separator layers such as separator layer 220) may be disposed within the cell housing 215. For example, a separator layer may be disposed between adjacent ones of the windings 221. However, the cylindrical cell implementation of FIG. 2D is merely illustrative, and other implementations of the battery cells 120 are contemplated.

For example, FIG. 2E illustrates an example in which the battery cell 120 is implemented as a prismatic cell. As shown in FIG. 2E, the battery cell 120 may have a cell housing 215 having a right prismatic outer shape. As shown, one or more layers of the anode 208, the cathode 212, and the electrolyte 210 disposed therebetween may be disposed (e.g., with separator materials between the layers) within the cell housing 215 having the right prismatic shape. As examples, multiple layers of the anode 208, electrolyte 210, and cathode 212 can be stacked (e.g., with separator materials between each layer) to form an electrode stack, or a single layer of the anode 208, electrolyte 210, and cathode 212 can be formed into a flattened spiral shape and provided in the cell housing 215 having the right prismatic shape. In the implementation of FIG. 2E, the cell housing 215 has a relatively thick cross-sectional width 217 and is formed from a rigid material. For example, the cell housing 215 in the implementation of FIG. 2E may be formed from a welded, stamped, deep drawn, and/or impact extruded metal sheet, such as a welded, stamped, deep drawn, and/or impact extruded aluminum sheet. For example, the cross-sectional width 217 of the cell housing 215 of FIG. 2E may be as much as, or more than 1 millimeter (mm) to provide a rigid housing for the prismatic battery cell. In one or more implementations, the first terminal 216 and the second terminal 218 in the prismatic cell implementation of FIG. 2E may be formed from a feedthrough conductor that is insulated from the cell housing 215 (e.g., a glass to metal feedthrough) as the conductor passes through to cell housing 215 to expose the first terminal 216 and the second terminal 218 outside the cell housing 215 (e.g., for contact with an interconnect structure 200 of FIG. 2B). However, this implementation of FIG. 2E is also illustrative and yet other implementations of the battery cell 120 are contemplated.

Figure 2F:
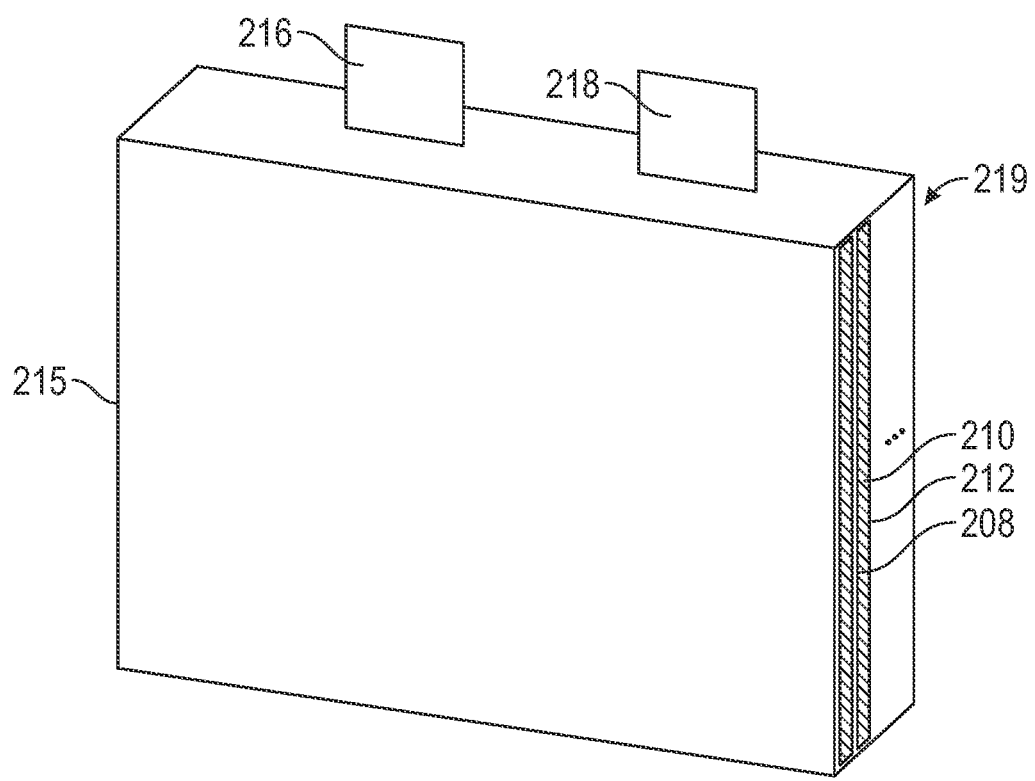
FIG. 2F illustrates a cross-sectional perspective view of a pouch battery cell in accordance with one or more implementations.

For example, FIG. 2F illustrates an example in which the battery cell 120 is implemented as a pouch cell. As shown in FIG. 2F, one or more layers of the anode 208, the cathode 212, and the electrolyte 210 disposed therebetween may be disposed (e.g., with separator materials between the layers) within the cell housing 215 that forms a flexible or malleable pouch housing. In the implementation of FIG. 2F, the cell housing 215 has a relatively thin cross-sectional width 219. For example, the cell housing 215 in the implementation of FIG. 2F may be formed from a flexible or malleable material (e.g., a foil, such as a metal foil, or film, such as an aluminum-coated plastic film). For example, the cross-sectional width 219 of the cell housing 215 of FIG. 2F may be as low as, or less than 0.1 mm, 0.05 mm, 0.02 mm, or 0.01 mm to provide flexible or malleable housing for the pouch battery cell. In one or more implementations, the first terminal 216 and the second terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 215 in these implementations. In the examples of FIGS. 2C, 2E, and 2F, the first terminal 216 and the second terminal 218 are formed on the same side (e.g., a top side) of the battery cell 120. However, this is merely illustrative and, in other implementations, the first terminal 216 and the second terminal 218 may formed on two different sides (e.g., opposing sides, such as a top side and a bottom side) of the battery cell 120. The first terminal 216 and the second terminal 218 may be formed on a same side or difference sides of the cylindrical cell of FIG. 2D in various implementations.

In one or more implementations, a battery module 115, a battery pack 110, a battery unit, or any other battery or battery sub-assembly may include some battery cells 120 that are implemented as solid-state battery cells and other battery cells 120 that are implemented with liquid electrolytes for lithium-ion or other battery cells having liquid electrolytes. One or more of the battery cells 120 may be included a battery module 115 or a battery pack 110, such as to provide an electrical power supply for components of the vehicle 100, the building 180, or any other electrically powered component or device. The cell housing 215 of the battery cell 120 can be disposed in the battery module 115, the battery pack 110, or installed in any of the vehicle 100, the building 180, or any other electrically powered component or device.

Figure 3:
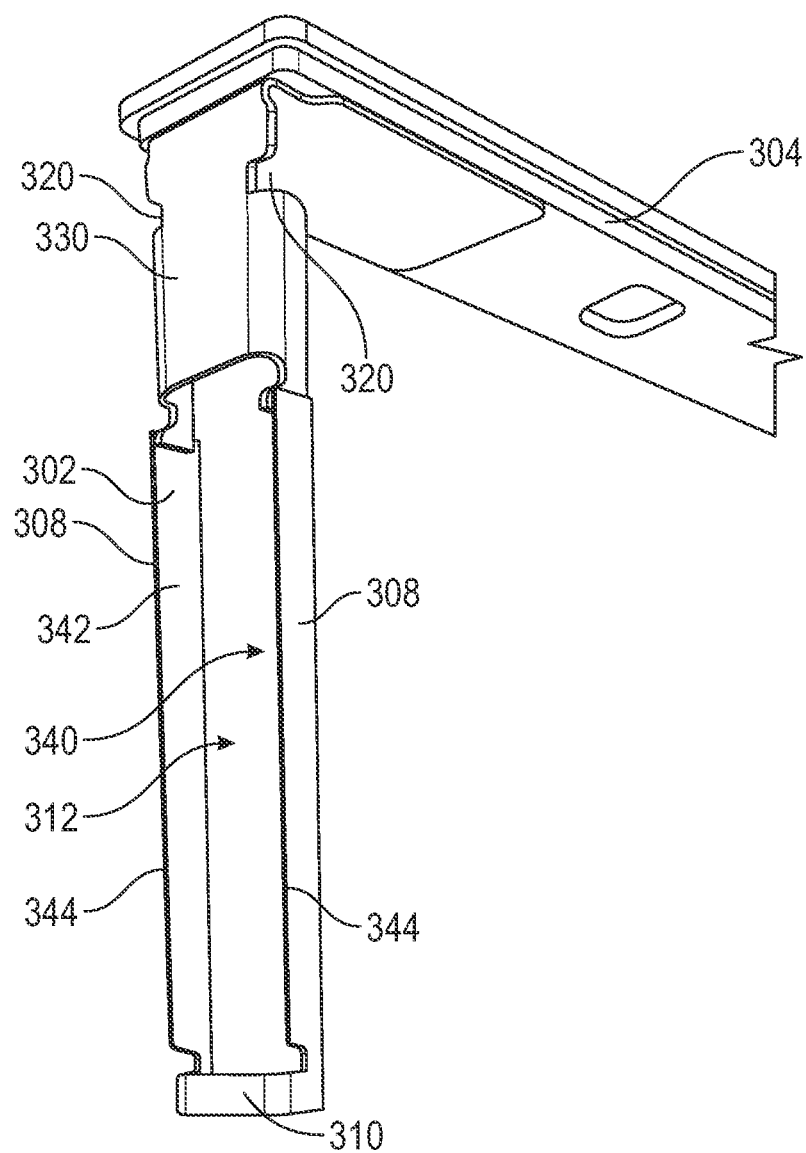
FIG. 3 illustrates a perspective view of a current collector for a battery cell in accordance with one or more implementations.

In one or more implementations in which the battery cell 120 is implemented as a prismatic battery cell, as in the example of FIG. 2E, the battery cell 120 may be provided with an insulator that prevents contact between a current collector of the battery cell and a cell housing (sometimes referred to herein as a can) of the battery cell. For example, FIG. 3 illustrates an exemplary current collector 302 that may be used in a prismatic battery cell. In this example, the current collector 302 extends from a lid 304 for the battery cell, and conductively couples to a terminal (e.g., first terminal 216 or second terminal 218, as shown in FIG. 2E) for the battery cell. When assembled in a battery cell, such as battery cell 120, the current collector 302 may be attached (e.g., welded) to one or more tabs (e.g., foil tabs) that extend from one or more electrodes of an electrode stack for the battery cell (e.g., extending from one or more anodes 208 or one or more cathodes 212), to conductively couple the electrodes to the terminal on the lid 304.

In the configuration of FIG. 3, the current collector 302 extends perpendicularly from the lid 304 and includes a base portion 330 extending from the lid 304 at a proximal end of the current collector (e.g., proximal to the lid 304), a pair of legs 308 extending (e.g., in parallel) from the base portion 330, and a cross-member 310 at a distal end of the current collector. As shown, an central opening 312 in the current collector 302 may be bounded by the base portion 330, the legs 308, and the cross-member 310. As shown, the current collector 302 may include one or more (e.g., a pair of) notches 320 at a first end (e.g., a proximal end) thereof (e.g., at or near an intersection between the base portion 330 and the lid 304). The central opening 312 may be defined, in part, by a first inner surface 340 of a first one of the legs 308 and a second inner surface 342 of a second one of the legs 308. As shown, each of the legs 308 may each have an edge 344 (e.g., each of which may define an outer edge of the current collector 302).

As discussed in further detail hereinafter, the legs 308 of the current collector 302 may be welded to one or more foil tabs of an electrode stack, and the electrode stack and the current collector may be inserted into a cell housing 215. Because the current collector 302 is an electrically active part of the battery cell when connected to an electrode stack, contact between the current collector 302 and the cell housing 215 can cause a hard short, which can send a voltage to the cell housing and/or permanently damage the battery cell. Such a hard short can occur, as examples, during insertion of an electrode stack and the current collector into a cell housing, and/or in a circumstance in which a battery cell experiences a mechanical impact or crush event.

Figure 4:
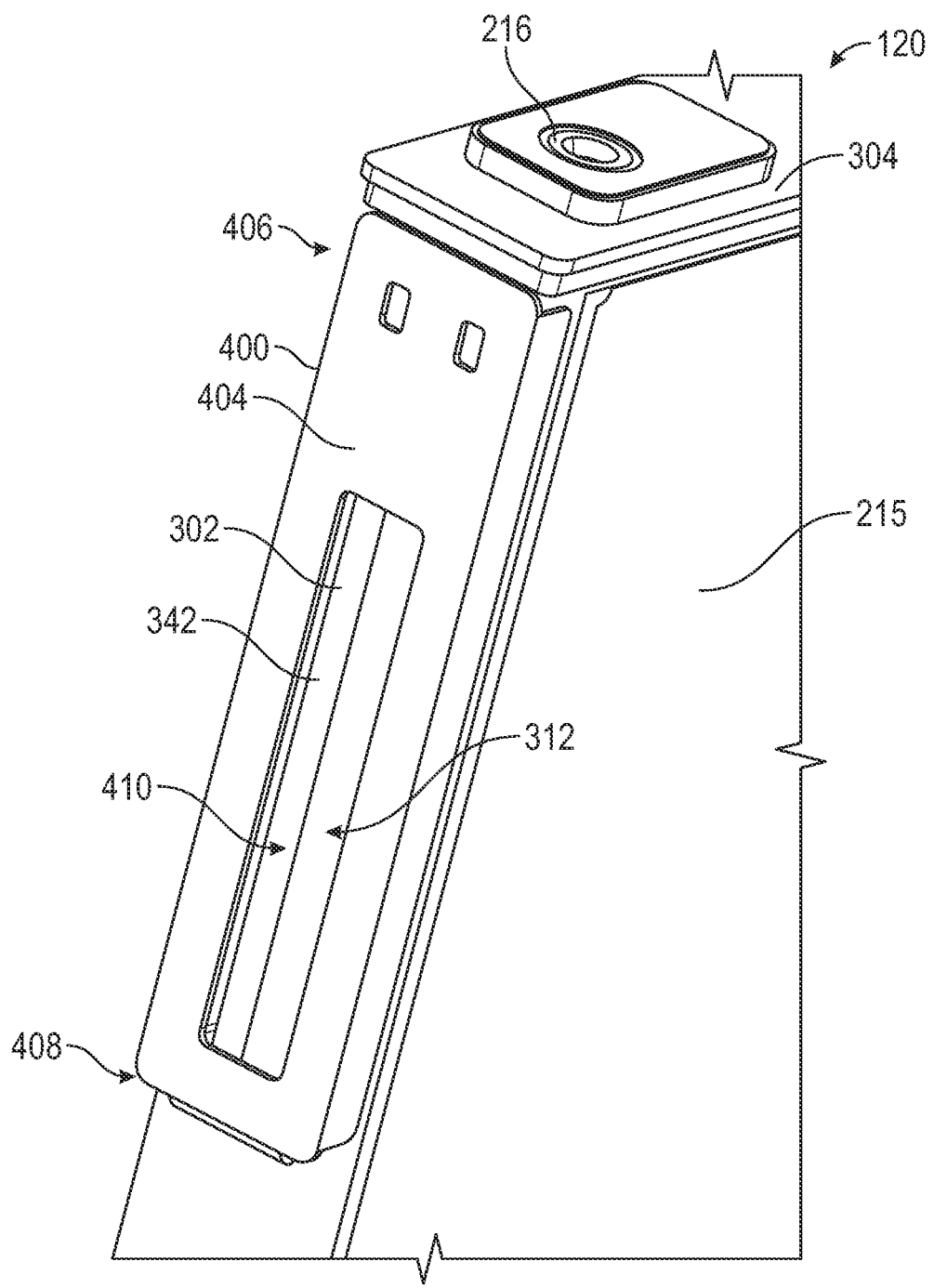
FIG. 4 illustrates a perspective view of an insulator attached to a current collector for a battery cell in accordance with one or more implementations.

In one or more implementations, a battery cell 120 may be provided with an insulator that prevents contact between the current collector 302 and the cell housing 215, including during and after insertion of an electrode stack and the current collector into the cell housing. In one or more implementations, the insulator may be a snap-in or snap-on insulator that attaches to the current collector via a snap fit. FIG. 4 illustrates an example of an insulator in accordance with one or more implementations of the subject technology.

As shown in FIG. 4, an insulator 400 may be configured to attach to and extend along a length of the current collector 302. As shown, the insulator may include a body 404. The body may be configured (e.g., sized, shaped, and/or positioned) to prevent a contact between the current collector and a housing (e.g., cell housing 215) of a battery cell, such as battery cell 120. In the view shown in FIG. 4, a portion of the cell housing 215 is omitted to allow the insulator 400 to be seen.

In the example of FIG. 4, the insulator 400 is attached to the current collector 302. In the perspective view of FIG. 4, an outer surface of the lid 304 is also visible, showing the first terminal 216 on the lid 304. In this configuration, the current collector 302 conductively couples an electrode stack (e.g., including one or more layers of anode 208, electrolyte 210, and cathode 212) within the cell housing 215 to the first terminal 216. As illustrated by FIG. 4, the lid 304 may form a top surface of an enclosure for the battery cell, with the remaining surfaces of the enclosure formed by the cell housing 215.

As shown, the body 404 of the insulator 400 may extend from a first end 406 (e.g., a proximal end) to a second end 408 (e.g., a distal end), and may include a central opening 410. As shown, the central opening 410 of the insulator 400 may align with the central opening 312 in the current collector 302 when the insulator 400 is attached to the current collector 302. In the example of FIG. 4, the second inner surface 342 of one of the legs 308 of the current collector 302 is visible through the central opening 410 in the insulator 400. The insulator 400 may be formed from one or more insulating materials. For example, the insulator 400 may be formed from an insert molded insulating material, such as an insert molded plastic or other polymer.

Figure 5:
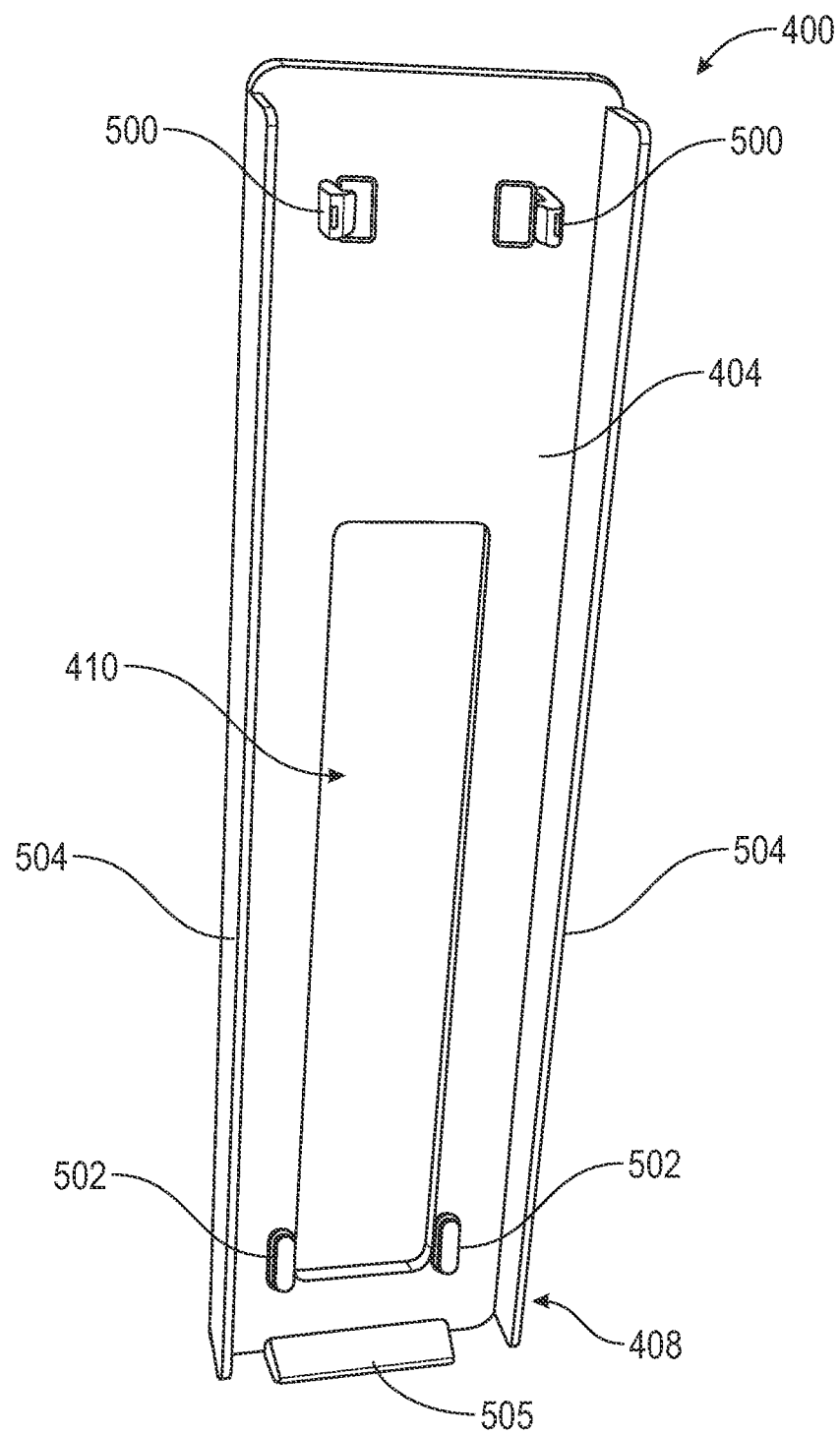
FIG. 5 illustrates another perspective view of an insulator for a current collector for a battery cell in accordance with one or more implementations.

In the example of FIG. 4, a first side (e.g., an outer surface) of the insulator 400 is shown. FIG. 5 illustrates a second side (e.g., an interior surface) of the insulator 400 in accordance with one or more implementations. As shown in FIG. 5, the insulator 400 may include one or more attachment features 500 (e.g., a pair of attachment features) at or near a first end 406 of the body 404. The attachment feature(s) 500 may be configured to attach the body to a first end (e.g., the proximal end) of the current collector 302. In one or more implementations, the attachment features 500 may include a pair of snap-in features configured to attach the body 404 to the current collector 302 using a snap fit. For example, the attachment feature(s) 500 may be extensions that extend (e.g., inwardly) from the body 404 and that are configured to be received into the notches 320 of the current collector 302. As shown, the insulator 400 may also include an attachment feature 505 at a second end 408 (e.g., a distal end) of the body 404.

In one or more implementations, the insulator 400 may be configured to snap onto (or into) the current collector 302 by, for example, providing the attachment features 500 (e.g., extensions from the body 404) into the notches 320 of the current collector, and snapping the attachment feature 505 onto a distal end of the current collector, such that the attachment features 500 and the attachment feature 505 apply forces to the current collector 302 in two or more substantially opposite directions to attach the insulator 400 to the current collector 302 via snap fit. In one or more implementations, the insulator 400 may be configured to snap onto (or into) the current collector 302 by, for example, placing the attachment feature 505 against a distal end of the current collector, and snapping the attachment features 500 into the notches 320 of the current collector, such that the attachment features 500 and the attachment feature 505 apply forces to the current collector 302 in two or more substantially opposite directions to attach the insulator 400 to the current collector 302 via a snap fit.

As shown in FIG. 5, the insulator may include one or more protrusions 502 (e.g., a pair of protrusions 502) at or near the second end 408 of the body. As shown, the protrusion(s) 502 may extend (e.g., inwardly) from the body 404 at one or more locations adjacent to a bottom of the central opening 410. In one or more implementations, the one or more protrusions 502 may be configured to prevent rotation of the body 404 with respect to the current collector 302. For example, the protrusion(s) 502 may be configured to extend into an opening, such as the central opening 312, in the current collector 302. For example, when the insulator 400 is snapped onto the current collector 302, a first protrusion 502 may engage with (e.g., and bear against) the first inner surface 340 of the central opening 312 in the current collector 302, and a second protrusion 502 may be configured to engage with (e.g., an bear against) an opposing second inner surface 342 of the central opening 312 in the current collector 302. In this way, one of the protrusions 502 may arranged to press against the first inner surface 340 to prevent rotation of the body 404 in a first direction, and the other one of the protrusions 502 may arranged to press against the second inner surface 342 to prevent rotation of the body 404 in a second direction opposite the first direction.

FIG. 5 also shows that the body 404 of the insulator 400 may include one or more flanges 504. For example, the flanges 504 may extend along the outer edges of the body 404, and may be formed from portions of the body 404 that are bent (e.g., at 90 degrees) from a central portion of the body 404. As shown, each of the flanges 504 may extend along substantially the entire length (e.g., from the first end 406 to the second end 408) of the body 404. Each of the flanges 504 may be configured to wrap around a corresponding edge 344 (see, e.g., FIG. 3) of the current collector 302. In this way, the flanges 504 can extend around the edges 344 of the current collector 302 and protect the legs 308 from contacting the cell housing 215.

For example, the insulator 400 may include a first flange 504 along a first edge of the body 404 and configured to wrap around a first corresponding edge 344 of the current collector 302, and a second flange 504 along an opposing second edge of the body 404 and configured to wrap around a second corresponding edge 344 of the current collector 302. As discussed in further detail hereinafter (see, e.g., FIG. 8), a portion of each of the flanges 504 that is configured to wrap around a corresponding edge 344 of the current collector 302 may be configured to be spaced apart from the current collector to form a gap between the current collector 302 and the portion of that flange 504, such as for accommodating one or more tabs of an electrode stack of the battery cell.

Figure 6:
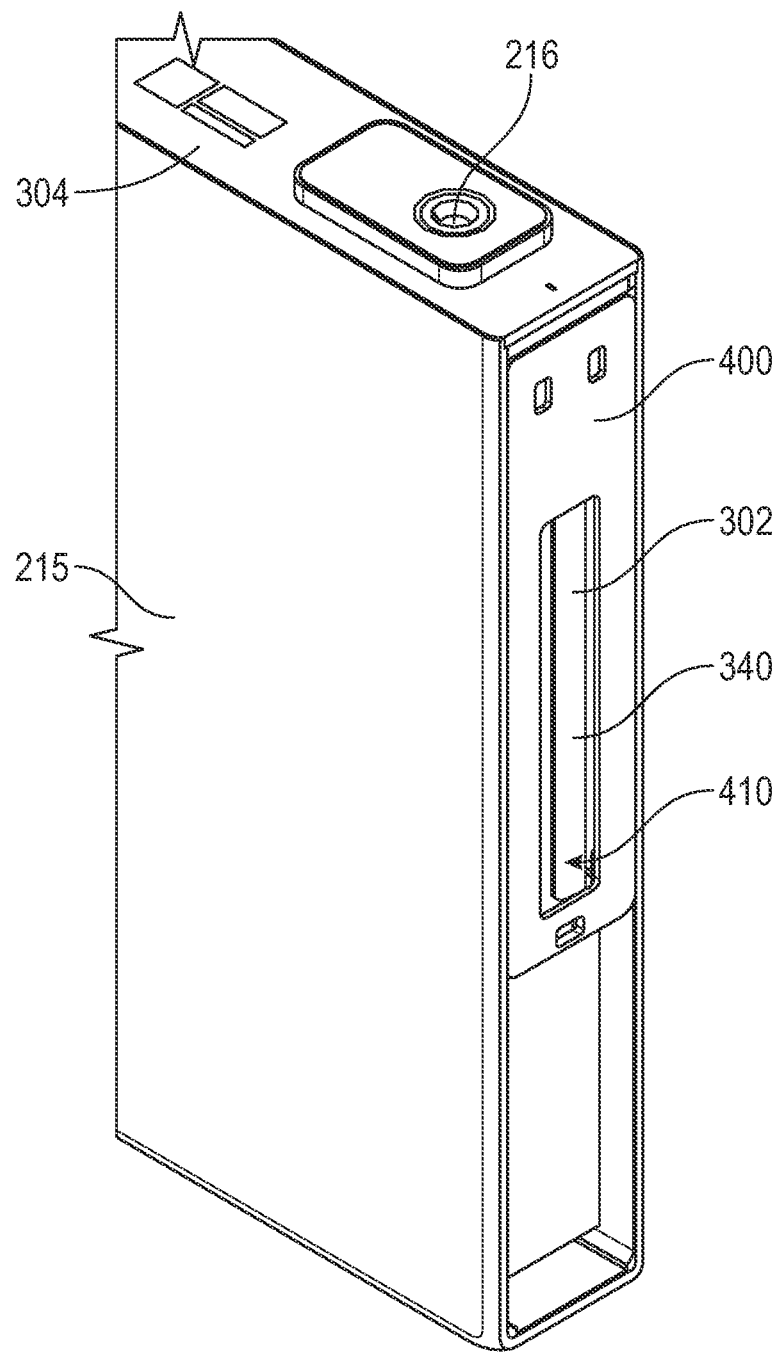
FIG. 6 illustrates a cross-sectional perspective view of a portion of a battery cell having an insulator in accordance with one or more implementations.

FIG. 6 illustrates another cross-sectional perspective view of the battery cell 120 with the insulator 400 attached to the current collector 302. In the example of FIG. 6, an assembly including the lid 304, the current collector 302 extending from the lid 304, and the insulator 400 attached to the current collector 302 are disposed within the cell housing 215, with a side wall of the cell housing 215 omitted to allow the insulator 400 and current collector 302 to be seen. In this view, it can be seen that the lid 304 may form a top surface of an enclosure of the battery cell, the enclosure formed from the cell housing 215 and the lid 304. In the example of FIG. 6, the first inner surface 340 of the current collector 302 can be seen through the central opening 410 in the insulator 400.

As shown by the examples of FIGS. 3-6, in one or more implementations, a battery cell 120 may be provided that includes an insulator 400 attached to and extending along a length of a current collector 302 of the battery cell, in which the insulator includes: a body 404 configured to prevent a contact between the current collector 302 and a housing (e.g., cell housing 215) of the battery cell; at least one attachment feature (e.g., one or more attachment features 500) at a first end 406 of the body, the at least one attachment feature configured to attach the body 404 to a first end 406 of the current collector; and at least one protrusion 502 at a second end 408 of the body 404, the at least one protrusion 502 configured to prevent rotation of the body 404 with respect to the current collector 302. As shown, the battery cell 120 may include the current collector 302, and may be implemented as a prismatic cell.

Figure 7:
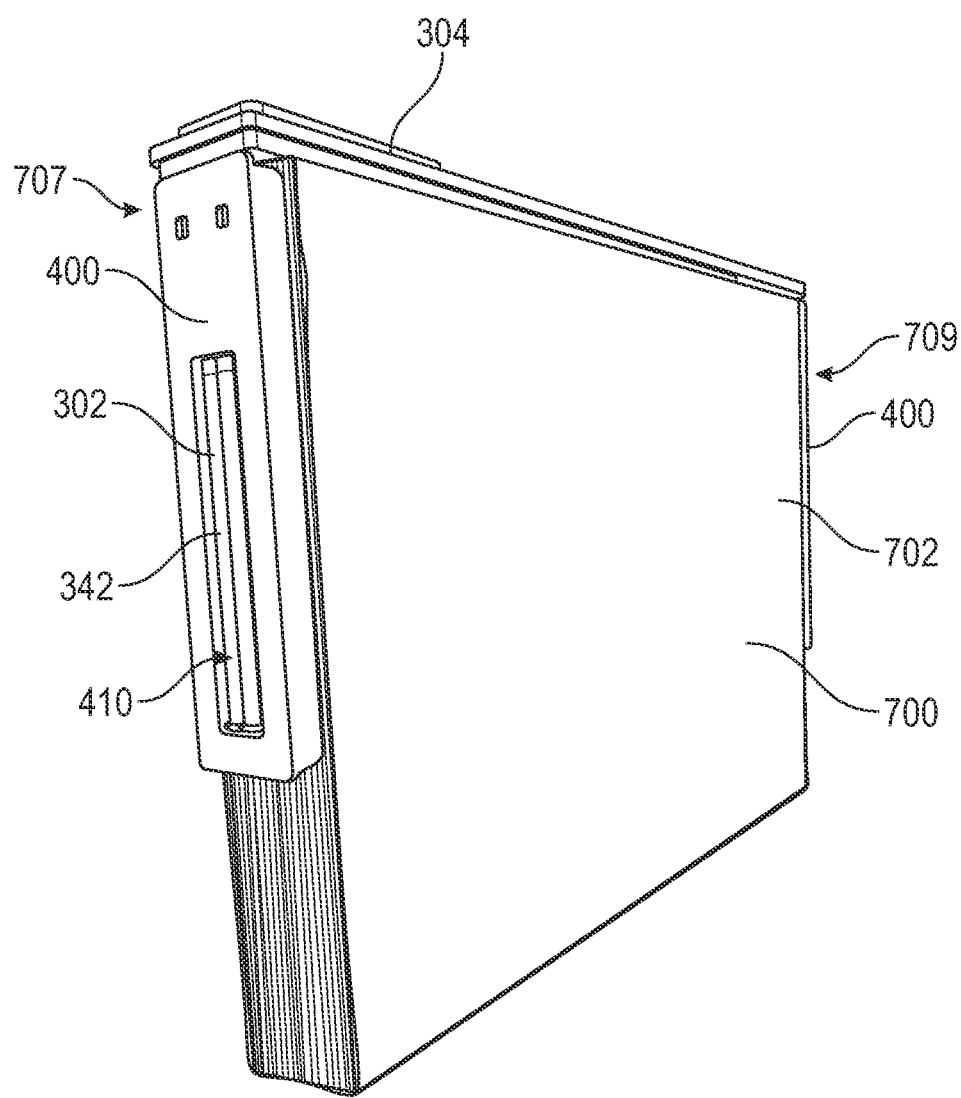
FIG. 7 illustrates a perspective view of an electrode stack that is conductively coupled to a current collector to which an insulator is attached in accordance with one or more implementations.

FIG. 7 illustrates a battery sub-assembly that includes an electrode stack 700. In the example of FIG. 7, the electrode stack 700 is attached to the current collector 302 (e.g., via one or more welds between the legs 308 current collector 302 and one or more foil tabs that extend from the electrode stack 700) that extends from the lid 304. In this example, the electrode stack 700 is wrapped in an insulating wrap 702 (e.g., an insulating tape). As shown, because the insulator 400 wraps around the current collector 302, the insulating wrap 702 may not be wrapped around or over the current collector 302 and/or the insulator 400. The battery sub-assembly shown in FIG. 7 may be inserted into a cell housing 215 (e.g., a cell housing having a five-sided right prismatic shape, and an opening configured to receive the battery sub-assembly of FIG. 7 and to be closed by the lid 304 of the battery sub-assembly).

In the examples of FIGS. 4, 6, and 7, a current collector 302 (e.g., and the insulator 400 attached thereto) is disposed at a first end 707 of the electrode stack 700 and/or the battery cell 120, and an insulator 400 is attached to the current collector 302. In one or more implementations, the current collector 302 that is disposed at the first end 707 of the battery cell 120 and the electrode stack 700 may be formed from a first material (e.g., copper) and may couple the electrode stack to a first (e.g., negative) terminal of the battery cell (e.g., first terminal 216). For example, the current collector 302 that is disposed at the first end 707 of the battery cell 120 and the electrode stack 700 may be welded to one or more foil tabs extending from one or more anode layers (e.g., anode 208) of the electrode stack 700.

In one or more implementations, a battery cell 120 may have an additional current collector at an opposing second end 709 of the battery cell and/or the electrode stack 700. For example, as shown in FIG. 7, an additional insulator 400 may be attached to the additional current collector at the opposing second end 709 of the battery cell 120 and/or the electrode stack 700. In one or more implementations, the current collector 302 that is disposed at the opposing second end 709 of the battery cell 120 and the electrode stack 700 may be formed from a second material (e.g., aluminum) and may couple the electrode stack to a second (e.g., positive) terminal of the battery cell (e.g., second terminal 218). For example, the current collector 302 that is disposed at the opposing second end 709 of the battery cell 120 and the electrode stack 700 may be welded to one or more foil tabs extending from one or more cathode layers (e.g., cathode 212) of the electrode stack 700.

Figure 8:
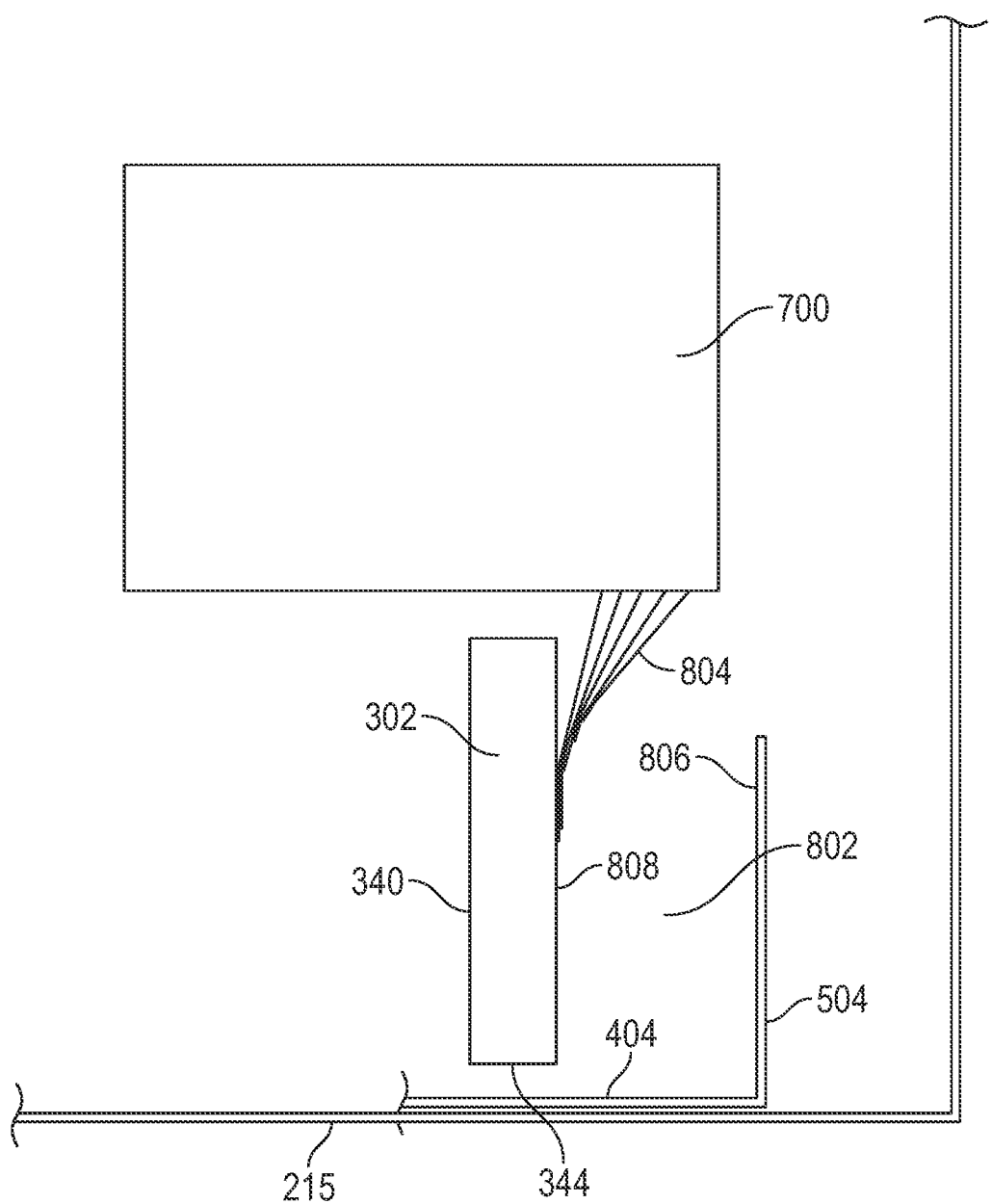
FIG. 8 illustrates a cross-sectional top view of a portion of a battery cell in which foil tabs extending from an electrode stack are disposed within a gap between a current collector and a flange of an insulator in accordance with one or more implementations.

FIG. 8 illustrates a cross-sectional top view of a portion of the battery cell 120 of FIGS. 3-7, in accordance with one or more implementations. As shown in FIG. 8, the body 404 of the insulator 400 may include a flange 504 (e.g., at each end of the body, as in FIG. 5) that wraps around a corresponding edge 344 of the current collector 302. As shown, at least a portion of the flange 504 that wraps around the corresponding edge 344 of the current collector 302 may be configured to be spaced apart from the current collector 302 to form a gap 802 between the current collector 302 and the portion of the flange 504 for accommodating one or more tabs 804 of an electrode stack 700 of a battery cell 120.

As shown, one or more tabs 804 (e.g., foil tabs or metalized polymer film tabs) may extend from the electrode stack 700 into the gap 802 between the flange 504 and the current collector 302 (e.g., a gap between an inner surface 806 of the flange 504 and an outer surface 808 of the current collector 302). As illustrated in FIG. 8, in one or more implementations, the tabs 804 may be welded to the current collector 302 (e.g., to the outer surface 808 of the current collector 302), and may be encompassed and/or protected by the flange 504 of the insulator 400.

Figure 9:
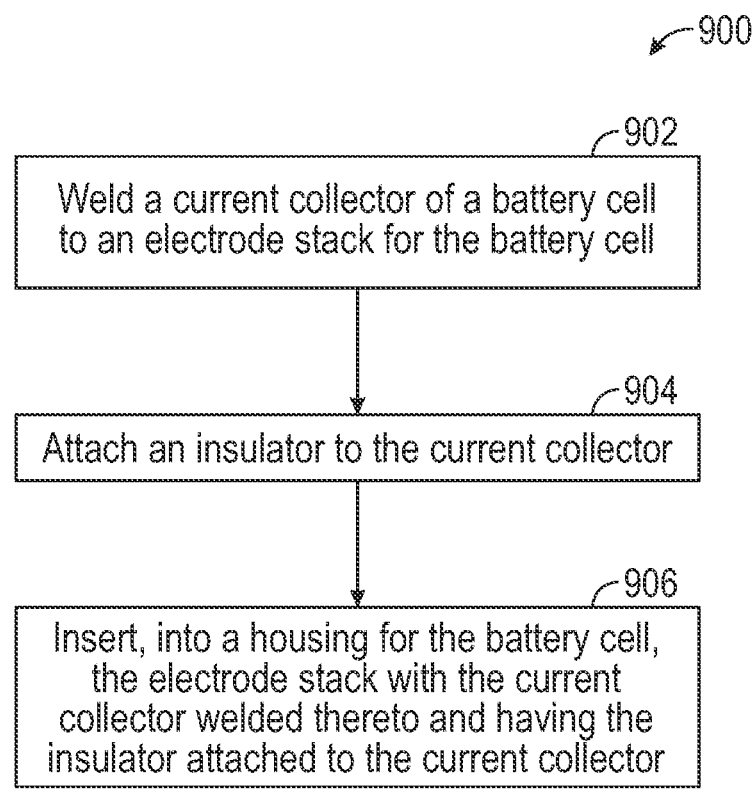
FIG. 9 illustrates a flow chart of illustrative operations that may be performed for assembling a battery cell in accordance with one or more implementations.

FIG. 9 illustrates a flow diagram of an example process that may be performed for assembling a battery cell, in accordance with implementations of the subject technology. For explanatory purposes, the process 900 is primarily described herein with reference to the battery cell 120 and the insulator 400 of FIGS. 3-8. However, the process 900 is not limited to the battery cell 120 and the insulator 400 of FIGS. 3-8, and one or more blocks (or operations) of the process 900 may be performed by one or more other structural components of other suitable moveable apparatuses, devices, or systems. Further for explanatory purposes, some of the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

As illustrated in FIG. 900, at block 902 the process 900 may include welding a current collector (e.g., current collector 302) of a battery cell (e.g., battery cell 120) to an electrode stack (e.g., electrode stack 700) for the battery cell. For example, welding the current collector to the electrode stack may include welding a plurality of foil tabs (e.g., tabs 804) extending from the electrode stack to the current collector.

At block 904, the process 900 may include attaching an insulator (e.g., insulator 400) to the current collector. The insulator may include at least one attachment feature (e.g., attachment features 500) at a first end (e.g., first end 406) and at least one protrusion (e.g., a protrusion 502) at an opposing second (e.g., second end 408). The at least one protrusion may be configured to prevent rotation of the insulator with respect to the current collector. For example, attaching the insulator to the current collector may include snapping the insulator onto (or into) the current collector 302 by, for example, providing the attachment features 500 (e.g., extensions from the body 404) into the notches 320 of the current collector, and snapping the attachment feature 505 onto a distal end of the current collector, such that the attachment features 500 and the attachment feature 505 apply forces to the current collector 302 in two or more substantially opposite directions to attach the insulator 400 to the current collector 302 via snap fit. As another example, attaching the insulator to the current collector may include snapping the insulator onto (or into) the current collector 302 by, for example, placing the attachment feature 505 against a distal end of the current collector, and snapping the attachment features 500 into the notches 320 of the current collector, such that the attachment features 500 and the attachment feature 505 apply forces to the current collector 302 in two or more substantially opposite directions to attach the insulator 400 to the current collector 302 via a snap fit.

In one or more implementations, attaching the insulator to the current collector may include at least partially encompassing the plurality of foil tabs in a gap (e.g., gap 802) between an outer surface (e.g., outer surface 808 of leg 308) of the current collector and a flange (e.g., flange 504) extending from the insulator.

At block 906, the process may include inserting, into a housing (e.g., cell housing 215) for the battery cell, the electrode stack with the current collector welded thereto and having the insulator attached to the current collector. For example, during (e.g., and after) the inserting, the insulator may prevent contact between the current collector and the housing of the battery cell. Once inserted, a lid (e.g., lid 304) from which the current collector extends, may form a top surface of an enclosure of the battery cell. The remaining surfaces of the enclosure may be formed by the housing of the battery cell.

In one or more implementations, the current collector is disposed at a first end (e.g., first end 707) of the battery cell, and process 900 also includes, prior to the inserting, attaching an additional insulator (e.g., an additional insulator 400) to an additional current collector at an opposing second end (e.g., opposing second end 709) of the battery cell.

Aspects of the subject technology can help improve the reliability of battery cells such as prismatic battery cells. This can help facilitate the functioning, reliability, and/or proliferation of electric vehicles, which can positively impact the climate by reducing greenhouse gas emissions.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus, comprising:
   an insulator configured to attach to and extend along a length of a current collector of a battery cell,
   wherein the insulator comprises:
   a body configured to prevent a contact between the current collector and a housing of the battery cell;
   at least one attachment feature at a first end of the body, the at least one attachment feature configured to attach the body to a first end of the current collector; and
   at least one protrusion at a second end of the body, the at least one protrusion configured to prevent rotation of the body with respect to the current collector.

2. The apparatus of claim 1, wherein the at least one protrusion is configured to extend into an opening in the current collector.

3. The apparatus of claim 2, wherein the at least one protrusion comprises a first protrusion and a second protrusion, wherein the first protrusion is configured to engage with a first inner surface of the opening in the current collector, and wherein the second protrusion is configured to engage with an opposing second inner surface of the opening in the current collector.

4. The apparatus of claim 1, wherein at least one attachment feature comprises a pair of snap-in features configured to attach the body to the current collector using a snap fit.

5. The apparatus of claim 1, wherein the body of the insulator is formed from an insert molded insulating material.

6. The apparatus of claim 1, wherein the body of the insulator further comprises at least one flange configured to wrap around at least one corresponding edge of the current collector.

7. The apparatus of claim 6, wherein the at least one flange comprises a first flange along a first edge of the body and configured to wrap around a first corresponding edge of the current collector, and a second flange along an opposing second edge of the body and configured to wrap around a second corresponding edge of the current collector.

8. The apparatus of claim 6, wherein a portion of the at least one flange is that is configured to wrap around the at least one corresponding edge of the current collector is configured to be spaced apart from the current collector to form a gap between the current collector and the portion of the at least one flange for accommodating one or more tabs of an electrode stack of the battery cell.

9. The apparatus of claim 1, wherein the body of the insulator comprises a central opening that is configured to align with a central opening of the current collector.

10. A battery cell, comprising:
    an insulator configured to attach to and extend along a length of a current collector of the battery cell,
    wherein the insulator comprises:
    a body configured to prevent a contact between the current collector and a housing of the battery cell;
    at least one attachment feature at a first end of the body, the at least one attachment feature configured to attach the body to a first end of the current collector; and
    at least one protrusion at a second end of the body, the at least one protrusion configured to prevent rotation of the body with respect to the current collector.

11. The battery cell of claim 10, further comprising the current collector, wherein the battery cell comprises a prismatic cell.

12. The battery cell of claim 11, wherein the current collector is disposed at a first end of the battery cell.

13. The battery cell of claim 12, further comprising an additional current collector at an opposing second end of the battery cell, and an additional insulator attached to the additional current collector.

14. The battery cell of claim 10, further comprising:
    an electrode stack;
    a lid; and
    an external contact forming a terminal on the lid;
    wherein the current collector connects the electrode stack to the terminal on the lid.

15. The battery cell of claim 14, wherein the body of the insulator further comprises at least one flange configured to wrap around at least one corresponding edge of the current collector.

16. The battery cell of claim 15, further comprising a plurality of tabs extending from the electrode stack into a gap between the at least one flange and the current collector.

17. A method, comprising:
welding a current collector of a battery cell to an electrode stack for the battery cell;
attaching an insulator to the current collector, wherein the insulator comprises at least one attachment feature at a first end and at least one protrusion at an opposing second end, the at least one protrusion configured to prevent rotation of the insulator with respect to the current collector; and
inserting, into a housing for the battery cell, the electrode stack with the current collector welded thereto and having the insulator attached to the current collector, wherein, during the inserting, the insulator prevents contact between the current collector and the housing of the battery cell.

18. The method of claim 17, wherein the welding comprises welding a plurality of foil tabs extending from the electrode stack to the current collector, and wherein attaching the insulator to the current collector comprises at least partially encompassing the plurality of foil tabs in a gab between the current collector and a flange of the insulator.

19. The method of claim 17, whetein the current collector is disposed at a first end of the battery cell, and wherein the method further comprises, prior to the inserting, attaching an additional insulator to an additional current collector at an opposing second end of the battery cell.

* * * * *

UNITED STATES PATENT AND TRADEMARK OFFICE
CERTIFICATE OF CORRECTION

PATENT NO. : 12,113,240 B1
APPLICATION NO. : 18/487972
DATED : October 8, 2024
INVENTOR(S) : Abigail Elizabeth Wucherer et al.

Page 1 of 1

It is certified that error appears in the above-identified patent and that said Letters Patent is hereby corrected as shown below:

In the Claims

Column 21; Line 20 (Claim 18): Replace "a gab between" with --a gap between--;

Column 21; Line 22 (Claim 19): Replace "17, whetein the" with --17, wherein the--.

Signed and Sealed this
Twenty-first Day of January, 2025

Coke Morgan Stewart
*Acting Director of the United States Patent and Trademark Office*